United States Patent
Richter et al.

(10) Patent No.: US 9,120,179 B2
(45) Date of Patent: Sep. 1, 2015

(54) MULTI-STEP CUTTING PROCESS

(71) Applicant: Apple Inc., Cupertino, CA (US)

(72) Inventors: Anthony J. Richter, San Jose, CA (US); Dale N. Memering, San Francisco, CA (US); Vincent Yan, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 311 days.

(21) Appl. No.: 13/623,595

(22) Filed: Sep. 20, 2012

(65) Prior Publication Data

US 2014/0076299 A1 Mar. 20, 2014

(51) Int. Cl.
*B28D 5/00* (2006.01)
*B23K 26/38* (2014.01)
*B28D 1/22* (2006.01)
*B23K 26/40* (2014.01)
*B23K 26/30* (2014.01)

(52) U.S. Cl.
CPC .............. *B23K 26/38* (2013.01); *B23K 26/4075* (2013.01); *B23K 26/421* (2013.01); *B28D 1/221* (2013.01); *B28D 5/0011* (2013.01)

(58) Field of Classification Search
USPC .................. 125/30.01; 264/482, 400; 428/43, 428/848.3; 219/121 LN
See application file for complete search history.

(56) References Cited

U.S. PATENT DOCUMENTS

| | | | |
|---|---|---|---|
| 3,453,097 A * | 7/1969 | Hafner | 65/112 |
| 3,885,943 A * | 5/1975 | Chui | 65/97 |
| 4,467,168 A * | 8/1984 | Morgan et al. | 219/121.67 |
| 4,682,003 A * | 7/1987 | Minakawa et al. | 219/121.72 |
| 6,376,797 B1 * | 4/2002 | Piwczyk et al. | 219/121.72 |
| 6,562,698 B2 * | 5/2003 | Manor | 438/460 |
| 7,512,297 B2 * | 3/2009 | Farah | 385/14 |
| 7,514,291 B2 * | 4/2009 | Akram | 438/110 |
| 2003/0116276 A1 * | 6/2003 | Weldon et al. | 156/345.1 |
| 2010/0215890 A1 * | 8/2010 | Lee et al. | 428/64.1 |

* cited by examiner

*Primary Examiner* — Joseph J Hail
*Assistant Examiner* — Brian Keller
(74) *Attorney, Agent, or Firm* — Brownstein Hyatt Farber Schreck, LLP

(57) ABSTRACT

Methods related to efficient processing of sapphire are discussed which are expected to both speed manufacture of corundum for applications and make the use of conundrum cost effective. In particular, one embodiment may take the form of a method of cutting a hard transparent material having a polished surface. The method includes roughening the polished surface, directing a laser beam at the hard transparent material to melt the material and removing the melted hard material.

27 Claims, 11 Drawing Sheets

MULTI-STEP CUTTING PROCESS

TECHNICAL FIELD

Systems and methods related to cutting polished hard materials are discussed. More particularly, systems and methods related to cutting polished corundum are disclosed.

BACKGROUND

Corundum is a crystalline form of aluminum oxide and is found in various different colors, all of which are generally commonly referred to as sapphire except for red corundum which is commonly known as ruby and pinkish-orange corundum which is known as padparadscha. Transparent forms of corundum are considered precious stones or gems. Generally, corundum is extraordinarily hard with pure corundum defined to have 9.0 Mohs and, as such, is capable of scratching nearly all other minerals. For the present purposes, the terms "corundum" and "sapphire" may be used interchangeably to refer generally to the crystalline form of aluminum oxide.

As may be appreciated, due to certain characteristics of corundum, including its hardness and transparent characteristics, among others, it may be useful in a variety of different applications. However, the same characteristics that are beneficial for particular applications commonly increase both the cost and difficulty in processing and preparing the sapphire for those applications. As such, beyond costs associated with it being a precious stone, the costs of preparing the corundum for particular uses is often prohibitive. For example, the sapphire's hardness makes cutting and polishing the material both difficult and time consuming when conventional processing techniques are implemented. Further, conventional processing tools such as cutters experience relatively rapid wear when used on corundum.

SUMMARY

Methods related to efficient processing of sapphire are discussed which are expected to both speed manufacture of corundum for applications and make the use of conundrum cost effective. In particular, one embodiment may take the form of a method of cutting a hard transparent material having a polished surface. The method includes roughening a portion of the polished surface, directing a laser beam on the roughened portion of the surface to melt and, thereby, cut through the hard material.

Another embodiment may take the form of a system for processing corundum including a roughening apparatus and a laser. The roughening apparatus initially receives a corundum member and roughens a polished surface of the corundum member. The laser then cuts through the corundum member by directing the laser at the portions of the polished surface that have been roughened.

Yet another embodiment may take the form of a method for cutting polished corundum including a surface preparation step and a cutting step. In the surface preparation step, a polished portion of the surface of the corundum is prepared for subsequent cutting through in-coupling of laser energy. In the cutting step, a laser is directed to the portion of the polished surface of the corundum that has been prepared.

While multiple embodiments are disclosed, still other embodiments of the present invention will become apparent to those skilled in the art from the following Detailed Description. As will be realized, the embodiments are capable of modifications in various aspects, all without departing from the spirit and scope of the embodiments. Accordingly, the drawings and detailed description are to be regarded as illustrative in nature and not restrictive.

DETAILED DESCRIPTION

Figure 1:
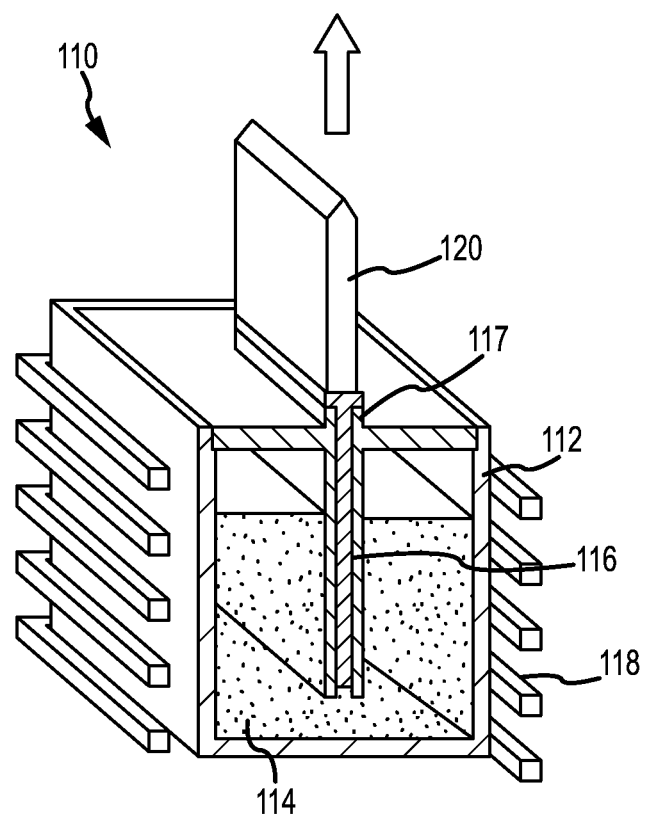
FIG. 1 illustrates an example system for growing sapphire according to the edge-defined film-fed growth process.

To help ease the cost of manufacturing and processing of corundum and other hard materials, various different techniques are being explored. Specifically, processes related to both the creation and growth of corundum as well as the subsequent processing of corundum that may help reduce the time and/or cost of creating corundum that may be useful in consumer electronic devices and elsewhere are being pursued. In some cases, after the corundum is grown, but before substantial subsequent processing of the corundum has occurred, one or more surfaces of the corundum member may be polished. As such, the corundum may be polished in bulk rather than as discrete post-cut members. This bulk polishing may provide both time and cost savings.

The polished surfaces may subsequently be cut with a laser to help preserve the polished finish and the cut corundum members may be used as lenses and cover glasses for consumer electronic product or in other applications where glass may conventionally be used. However, in-coupling of laser energy into the corundum is challenging due to the polished surface. In particular, at certain combinations of laser wavelengths, pulse lengths, and pulse energies, the polished surface of corundum is transparent to the laser and has poor energy absorption properties. This prevents effective cutting of the material. In order for the laser energy to better in-couple, thereby laser cutting the corundum, the polished surface may be roughened. The roughening may be a specific location or in the form of a cutting pattern, whereby the cutting pattern has the same shape as the final shape of the cut corundum.

In some embodiments, the surface roughening step may be performed by a mechanical grinding tool or cutter that may be used to roughen the corundum surface. In other embodiments, the surface roughening step may be performed by a laser. The roughening laser may operate at different frequencies, wavelengths, pulse energies, or pulse lengths from the laser that is used to cut through the corundum. In some embodiments, the same laser may be used for both the roughening and cutting steps, with the laser being reconfigurable to function as a roughener or a cutter.

Generally, the process of growing sapphire starts with alumina powder that is subjected to a densification process to form densified alumina (or crackle). The alumina is melted and a seed crystal is inserted into the molten alumina. The molten alumina is then cooled with precisely controlled temperatures and the crystal is formed on the seed. Additional processing steps such as cutting and polishing the formed crystal may be performed, as well as annealing steps to help "heal" the crystalline structure of defects that may have formed during growth or subsequent processing.

Among the various processes for growing sapphire are those that generate a sapphire boule, such as the Kyropoulos, Verneuil, Czochralski, flux, and hydrothermal. Other processes may grow sapphire with a defined shape such as the edge-defined film-fed growth ("EFG" or "Stepanov") method, the Bridgman (i.e., horizontal moving growth) method and vertical horizontal gradient freezing ("VHGF") method which generate sapphire having continuous cross-sections. It should be appreciated that although specific examples described herein may refer to a particular process for sapphire growth the examples are not intended to be limiting. As such, the present techniques, systems and methods may be used in conjunction with each of the various sapphire growth processes. More specifically, the present techniques may be used on sapphire acquired through any of the various growth methods.

Turning to the drawings and referring initially to FIG. 1, a system 110 for growing sapphire according to the EFG process is illustrated with a cross-sectional view of crucible 112. The crucible 112 holds alumina melt 114 or molten alumina. The molten alumina 114 is drawn up a melt supply slit of a die 116 which may take the form of two close, parallel plates which draw the molten alumina up through capillary action. The die 116 may extend to a die tip 117 at a boundary of the crucible heating elements 118 may surround and heat the crucible 112. A seed crystal (not shown) may be brought into contact with the molten alumina at the die tip 117 which propagates crystalline growth and a sapphire ribbon 120 may be drawn upwardly out of the crucible 112. The sapphire ribbon 120 is formed in the shape of the die tip 117 and the sapphire crystalline structure of the ribbon follows the existing orientation of the seed.

Generally, regardless of the process used to grow the sapphire 120, additional processing helps achieve a suitable size, shape and quality of the sapphire for use, such as in consumer electronic devices or other applications. In some cases, a sapphire ribbon, such as one formed through the EFG process or a sapphire wafer cut from a boule formed through a different process, may be polished before being cut or may otherwise have a generally smooth surface such that laser energy is not able to in-couple into the sapphire to melt or cut the sapphire.

Figure 2:
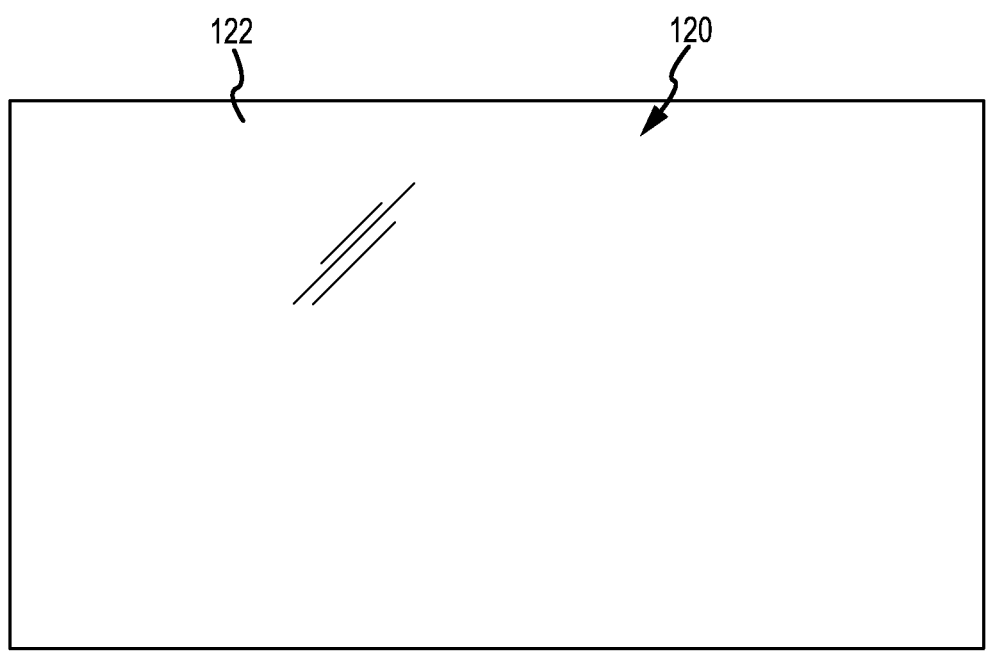
FIG. 2 illustrates an example sapphire ribbon produced by the system of FIG. 1.

FIG. 2 illustrates an example sapphire ribbon 120, such as the one from the EFG process illustrated in FIG. 1 that may have a polished surface 122. The sapphire ribbon 120 may have a generally consistent cross-sectional area or consistent thickness. In some embodiments, the surface area of the ribbon 120 may be only slightly larger than that of a desired sapphire member so that the ribbon produces a high rate of yield, thereby reducing the amount of sapphire wasted.

Figure 3A:
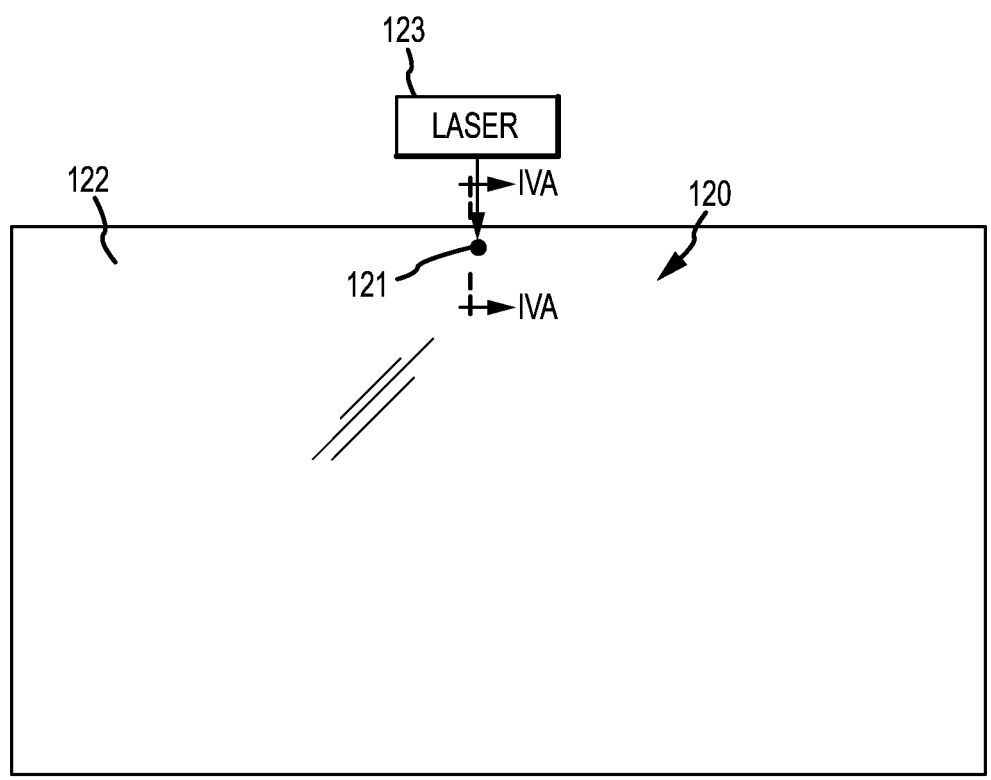
FIG. 3A illustrates a first roughening technique for roughening a polished surface of the sapphire ribbon of FIG. 2.

FIG. 3A illustrates a first roughening technique for roughening the polished surface 122 of the sapphire ribbon 120. Specifically, a laser 123 may be directed towards the sapphire ribbon 120. The laser 123 may be focused anywhere on the x-axis of the ribbon 120. That is, the laser 123 may be focused anywhere at or below the polished surface 122. In some embodiments, the laser 123 may have pulse lengths in the picosecond or femtosecond range. In other embodiments, the laser 123 may have pulse lengths in the microsecond range. The microsecond pulsed laser may also be used in a cutting step, as discussed in greater detail below. It should be appreciated that the lasers may be operated in any suitable manner and the specific details of their operation may be selected based upon empirical data gathered through use. As such, their average power, peak power, pulse energies, pulse lengths, frequency of operation (e.g. pulse rate), as well as the manner in which they move to either roughen or cut through the sapphire may be tuned to the process.

Figure 4A:
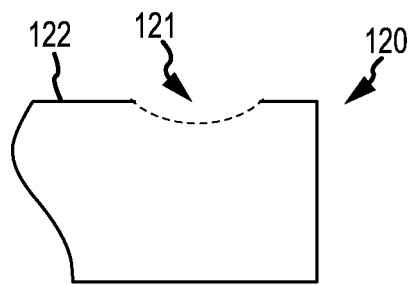
FIG. 4A is a cross-sectional view of the sapphire ribbon taken along line IVA in FIG. 3A and showing the roughened surface.

The laser 123 may be moved relative to the sapphire ribbon 120 (or the sapphire ribbon may be moved relative to the laser) or may remain stationary to create a roughened spot 121 in the polished surface. The speed at which the laser 123 may be moved may depend upon the frequency of the laser and the power level at which it is operating, among other things. The laser may be operated according to a suitable set of parameters that effectuate a roughening of the surface of the sapphire ribbon. For example, in some embodiments, the focus position, a lower energy density, a higher energy density or some combination of the energy density and focus position along with other parameters may be implemented to achieve the roughening effect. FIG. 4A illustrates a cross-sectional view taken along line IVA in FIG. 3A showing the roughened spot 121 in the polished surface 122.

Figure 3B:
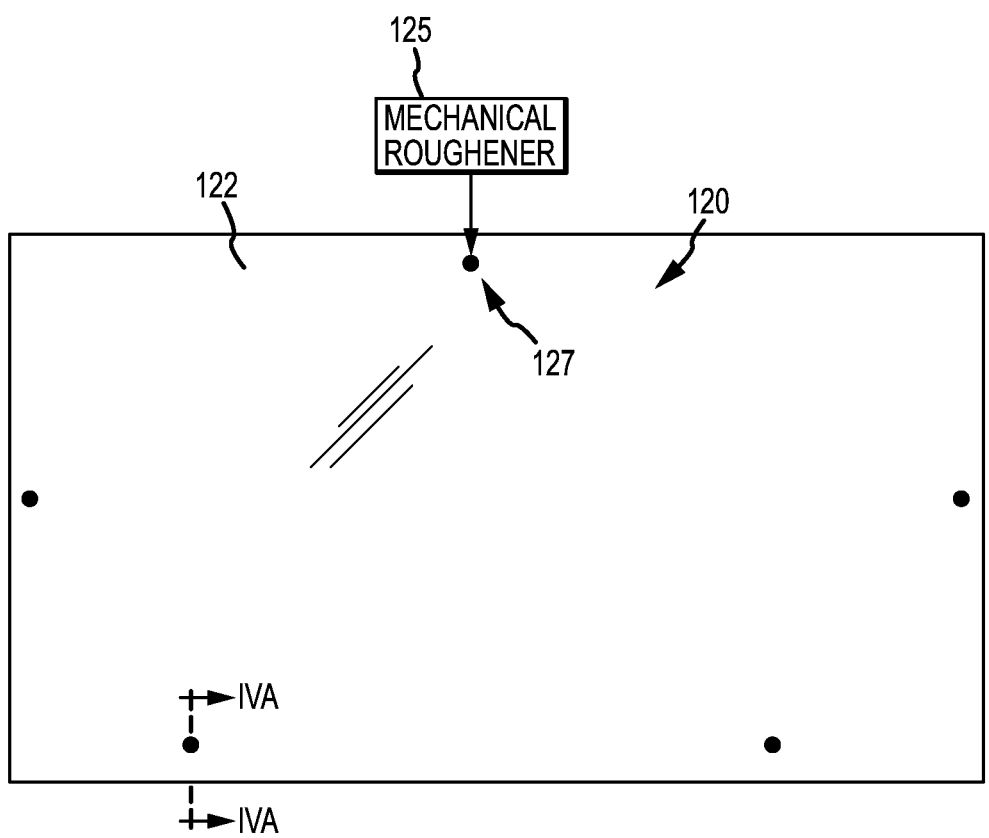
FIG. 3B illustrates a second roughening technique for roughening a polished surface of the sapphire ribbon of FIG. 2.

FIG. 3B illustrates a second roughening technique for roughening the polished surface 122 of the sapphire ribbon 120. The second technique includes use of a mechanical roughener 125, such as a grinding tool controlled by computer numerical code (CNC) techniques and the like. The mechanical roughener 125 may move relative to the sapphire ribbon 120 to form the roughened spot 127 on the polished surface 122 or, alternatively, may remain stationary relative to the sapphire surface. Additionally, it should be appreciated that there may be multiple different roughened spots on the surface. Each roughened spot may be created by the same mechanical roughener or multiple rougheners may be employed. Employing multiple rougheners may help speed the process. Relatedly, multiple lasers may be used in a cutting step to help speed the process.

Figure 4B:
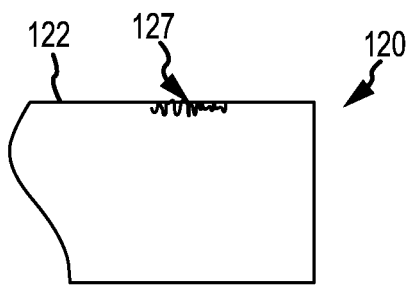
FIG. 4B is a cross-sectional view of the sapphire ribbon taken along line IVB in FIG. 3B and showing the roughened surface.

FIG. 4B is a cross-sectional view of the sapphire ribbon 120 taken along line IVB in FIG. 3B showing the roughened spot 127 on the polished surface 122. It should be appreciated that the roughened surfaces illustrated in FIGS. 4A-4B are merely illustrative and in an actual implementation, the roughened spot 127 may appear different from what is illustrated. Generally, the roughened spot 127 is created in the polished surface to allow for in-coupling of laser energy in a melting step. Whereas the laser energy would either pass through or reflect off of a polished surface, it is absorbed into the sapphire through the roughened spot to allow for melting or ablation of the sapphire.

Figure 3C:
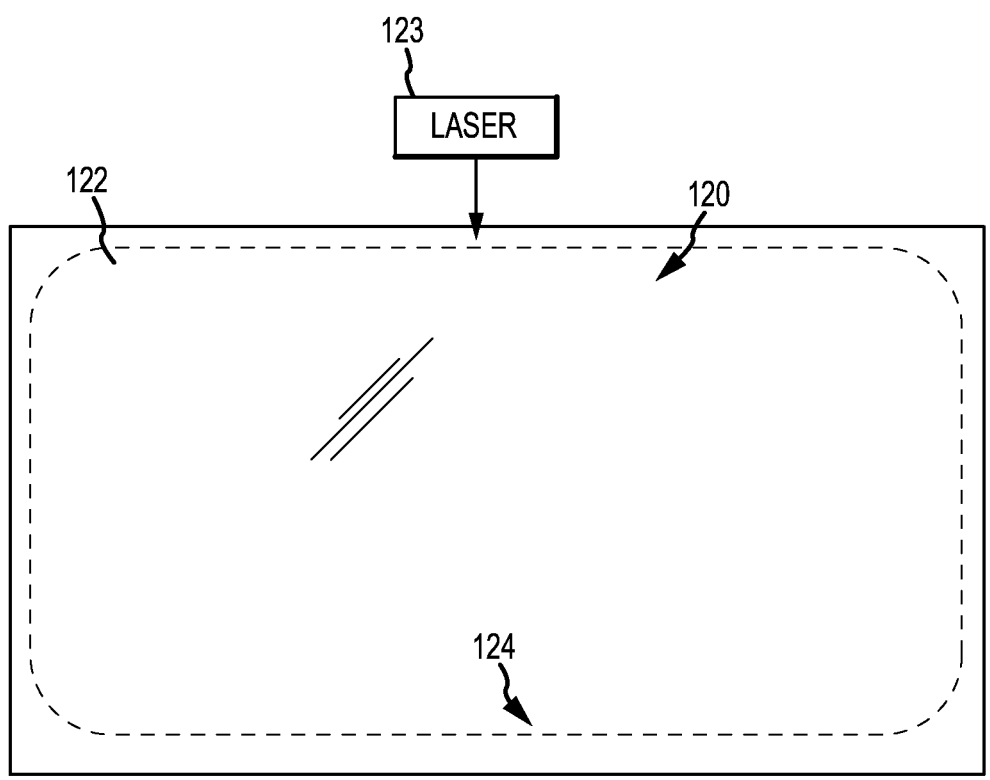
FIG. 3C illustrates a third roughening technique for roughening a polished surface of the sapphire ribbon of FIG. 2.

FIG. 3C illustrates another embodiment in which the laser 123 is used to roughen the surface of the sapphire. As illustrated in FIG. 3C, the laser may move relative to the sapphire member so as to create a cutting pattern 124 on the surface of the sapphire. The movement and positioning of the laser 123 may be precisely controlled so as to create the pattern 124 (dashed line) of a desired sapphire member.

In yet another roughening technique, the polished surface 120 is chemically etched. A mask may initially be provided to cover portions of the polished surface that are not to be roughened and a non-masked portion of the polished surface generally takes the form of the desired sapphire member shape. An etching agent is applied to the surface (or the surface is exposed to the etching agent) to roughen the non-masked portions of the polished surface. A cleansing step may be implemented to remove or neutralize the etching agent before or after the mask is removed.

Figure 5:
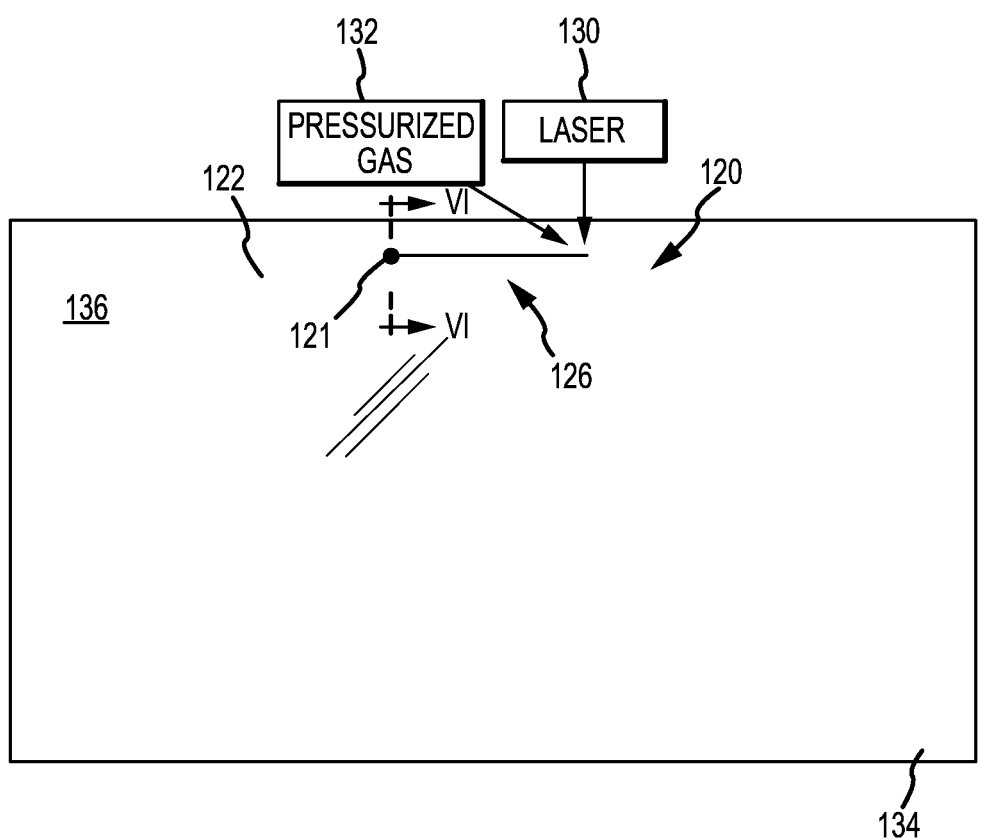
FIG. 5 illustrates the sapphire ribbon during a laser cutting phase.

Turning to FIG. 5, a cutting step is illustrated. In the cutting step, a laser 130, such as a microsecond fiber laser, is focused on the roughened spot 121 to laser cut the sapphire ribbon 120. The laser 130 may implement different pulse lengths, frequencies, pulse energies, and varying average power levels than the laser 123 of the roughening step. Additionally, the laser may be focused at the roughened spot on the surface or at some point below the roughened spot. That is, the laser 130 may be focus at some point in the middle of the sapphire member or near a back surface of the sapphire member, rather than on the surface which that was roughened. In one case, the laser may cause the sapphire to melt when it in-couples and heats the sapphire. Once the laser has in-coupled and begun to melt the sapphire, it may move away from the position of the roughened spot and continue to melt the sapphire. In a second case, the laser may cause material removal through an ablation process, where layers of sapphire are ablated over multiple cutting passes.

It should be appreciated that the laser 130 may operate according to a set of parameters that effectuate the melting or ablation of the sapphire. In one embodiment, the laser 130 may operate at approximately between 25 and 100 Watts average power. In other embodiments, the laser 130 may operate at higher or lower average power levels. Additionally, the laser 130 may operate in any suitable range of the electromagnetic spectrum. In one embodiment, the laser 130 may operate in the infrared region of the spectrum. Further, one or more operating parameters may be adjusted and/or fine tuned based upon one or more other operating parameters. That is, there may be dependency between one or more operating parameters, such that when one parameter is changed another parameter may be correspondingly changed.

In some embodiments, the same laser may be used as both the roughening laser 123 and the cutting laser 130. The laser would then make at least two separate passes over the sapphire ribbon 120. A first pass may roughen the polished surface 120 and one or more subsequent passes may cut through the sapphire ribbon 120. The laser's setting may be adjusted in between passes to adjust for roughening or cutting. One advantage of using the same laser for both the roughening and cutting steps is that the sapphire ribbon 120 and the laser would not need to be transported for the duration of both steps. Rather, the sapphire ribbon 120 could remain in place while the laser moved to perform both steps, for example.

Figure 6:
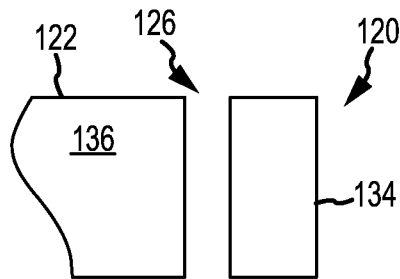
FIG. 6 is a cross-sectional view of the sapphire ribbon taken along line VI in FIG. 5 after the cutting step is complete.

Pressurized gas, such as air, nitrogen gas or other suitable gas, 132 is directed at the melted sapphire to remove it, leaving a cut 126 through the sapphire ribbon 120. FIG. 6 is a cross-sectional view of sapphire ribbon 120 taken along line VI after the cutting step showing the cut 126 through the sapphire ribbon.

Figure 7:
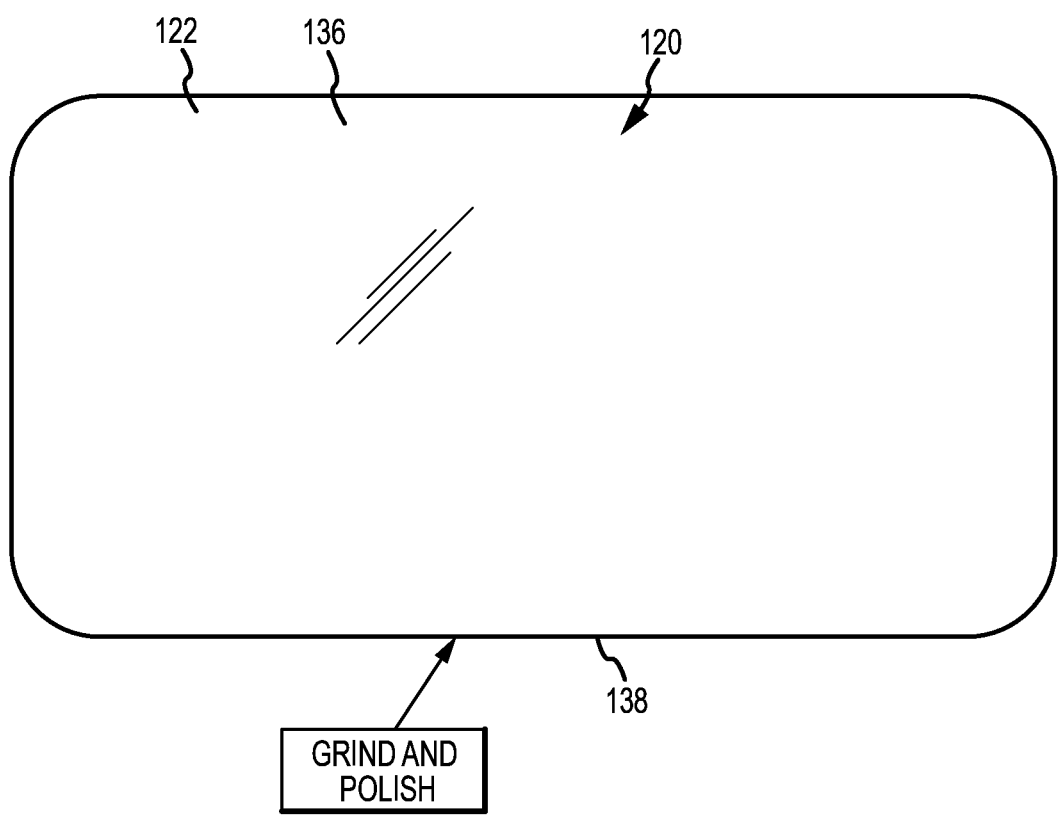
FIG. 7 illustrates a grinder/polisher being applied to an edge of a sapphire member cut from the sapphire ribbon.
Figure 8:
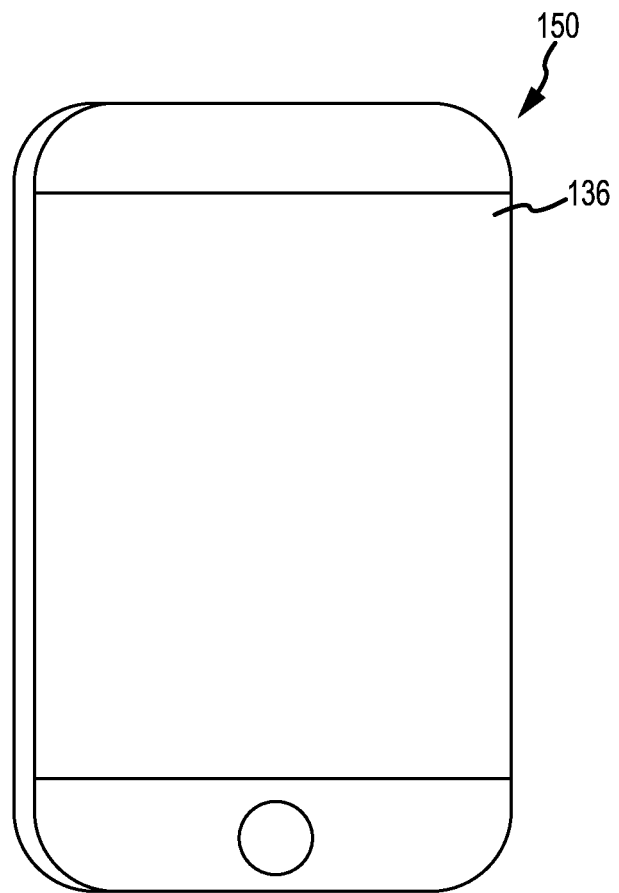
FIG. 8 illustrates an example electronic device in which the sapphire member of FIG. 7 may be implemented.

After the cutting step, the sapphire member 136 may be removed or separated from the ribbon 120 and the remaining portion 134 of the ribbon may be disposed of. The sapphire member 136 may undergo further processing, such as an edge grinding and/or polishing of the surface 138 that was adjacent to the melted material. FIG. 7 illustrates grinder/polisher being applied to the edge 138 of the sapphire member 136. Other processing steps may also be performed on the member including, but not limited to, additional cutting, polishing and/or grinding steps. After any further processing steps are performed, the sapphire member 136 may be ready for installation. FIG. 8 illustrates an example electronic device 150 in which the sapphire member 136 may be implemented.

Figure 9:
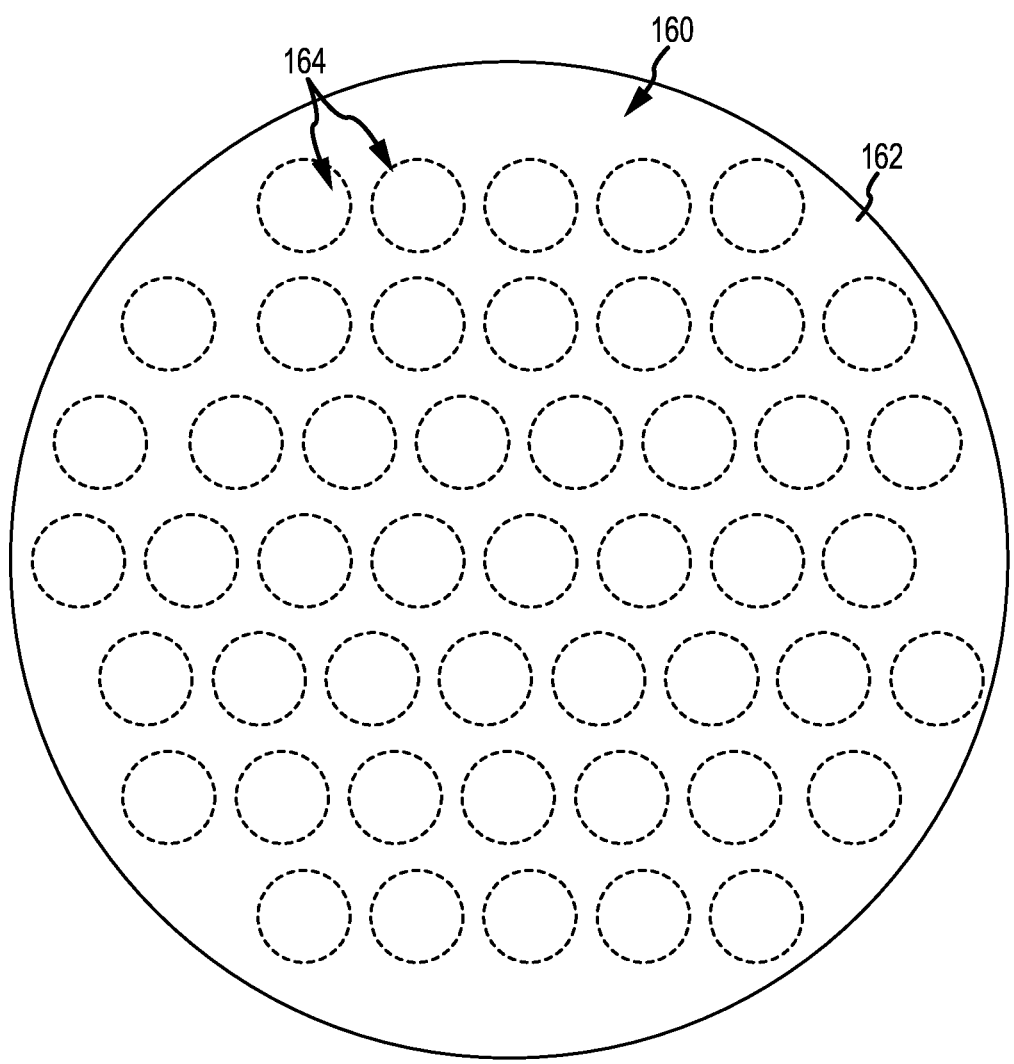
FIG. 9 illustrates a sapphire wafer from which many sapphire members may be cut.

FIG. 9 illustrates a sapphire wafer 160 from which many sapphire members may be cut. Generally, the sapphire wafer 160 may be sliced from a grown sapphire boule. One or both sides of the wafer 160 may be polished prior to cutting out sapphire members 164. In particular, a top surface 162 of the sapphire boule may be polished. As such, each of the sapphire members 164 may have at least one polished side upon being cut from the wafer 160. The cutting of sapphire members 164 from the wafer may be performed through a roughening step followed by a laser cutting/melting step, as discussed above.

Figure 10:
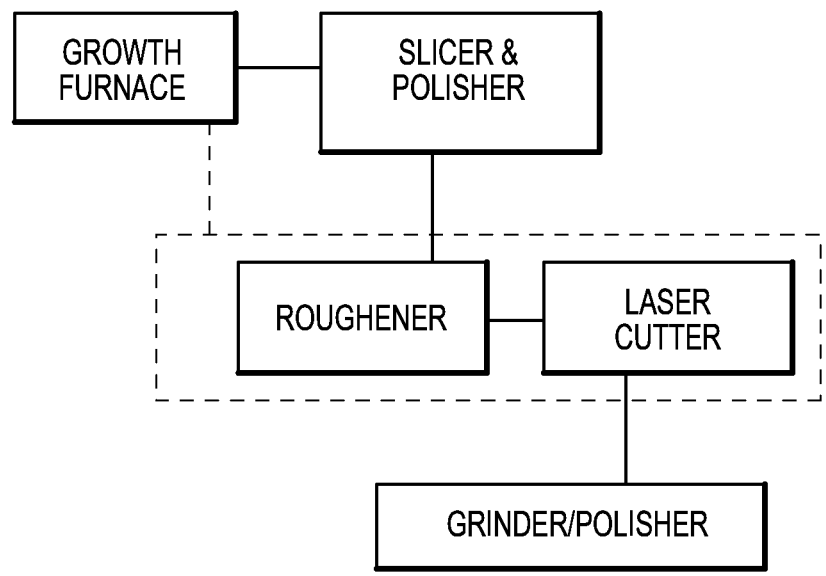
FIG. 10 illustrates an example sapphire growth and processing system which includes a laser cutter in accordance with an example embodiment.

FIG. 10 illustrates an example sapphire growth and processing system 170 in accordance with an example embodiment. The system 170 includes a sapphire growth furnace 172, which may take any suitable form such as an EFG furnace for example. Additionally, the system 170 may include preprocessing equipment such as slicers and polishers 174. Additionally, an annealing furnace may be provided to help cure any defects in the sapphire crystal from the growth phase. The system includes a cutting system 176 that includes a roughener 178 and a laser cutter 180. As discussed above, the laser cutter 180 may be configurable such that its power level and/or focal point may be adjusted so that it may serve dual purposes as a roughener and cutter.

The system 170 may further include equipment for one or more post-processing steps such as grinding and polishing. An annealing furnace may also be provided after cutting the sapphire members to cure any defects that resulted from the cutting and/or other processing steps.

The system 170 is believed to achieve efficiencies based on the equipment and processes performed in creating a sapphire member for use in electronic devices. In particular, the laser cutting of the sapphire is anticipated to save costs in the long run as it will not experience wear in the same way a mechanical cutter would. Additionally, the speed at which the laser cutter may operate may provide for increased production. Moreover, the processes and systems described herein may scale well and may be configurable to achieve further efficiencies. In particular, for example, one or more rougheners may feed a single laser cutter or a single roughener may feed multiple laser cutters.

Although the foregoing discussion has presented specific embodiments, persons skilled in the art will recognize that changes may be made in form and detail without departing from the spirit and scope of the embodiments. Accordingly, the specific embodiments described herein should be understood as examples and not limiting the scope thereof.

What is claimed is:

1. A method of cutting a sapphire sheet using a laser, the method comprising:

obtaining a sapphire sheet having a polished surface, wherein the polished surface is substantially transparent to optical energy produced by a cutting laser beam;

roughening a portion of the polished surface;

directing a cutting laser beam on the roughened portion, wherein the polished surface outwardly faces the cutting laser beam;

in-coupling light from the laser beam at the roughened portion to initiate a cut into the sapphire sheet, wherein the in-coupling of the light is due to the optical properties of the roughened portion; and cutting the sapphire sheet using the laser beam along a path to form a part material.

2. The method of claim 1, wherein directing the cutting laser beam on the roughened portion comprises directing a microsecond pulse length laser on the roughened portion to cut through the hard material.

3. The method of claim 2, wherein the average power of the microsecond pulse length laser is between 25 and 150 Watts.

4. The method of claim 1, wherein roughening the polished surface comprises directing a roughening laser beam at the hard material, the roughening laser beam focused anywhere in a z-axis of the hard material.

5. The method of claim 4, wherein the roughening laser beam comprises a picosecond pulsed laser.

6. The method of claim 4, wherein the roughening laser beam operates according to a set of parameters that effectuates a roughening of the surface of the hard part.

7. The method of claim 6, wherein the cutting laser beams operates according to a set of parameters different from those of the roughening laser.

8. The method of claim 1, wherein the sapphire sheet is formed from a sapphire boule.

9. The method of claim 1, wherein the part is for use as a cover for an electronic device.

10. The method of claim 1, wherein roughening the polished surface comprises:
   applying a mask to the polished surface;
   chemically treating the surface; and
   removing the mask.

11. The method of claim 1, wherein roughening the polished surface comprises mechanically etching or grinding the polished surface.

12. The method of claim 11, comprising utilizing a CNC grinding machine.

13. The method of claim 1, wherein the roughened portion comprises a cutting pattern.

14. A system for processing corundum comprising: a roughening apparatus which receives a corundum member having a polished surface which is transparent to a cutting laser beam, wherein the roughening apparatus is configured to roughen the polished surface to in-couple of light of the cutting laser beam that initiates a cut in the corundum; and a cutting laser configured to cut the corundum member by directing the cutting laser at a roughened portion of the polished surface, wherein the roughened portion outwardly faces the cutting laser beam.

15. The system of claim 14, wherein the roughening apparatus comprises a mechanical roughening apparatus.

16. The system of claim 14, wherein the mechanical roughening apparatus comprises a CNC grinding tool.

17. The system of claim 14, wherein the roughening apparatus comprises a roughening laser.

18. The system of claim 14, wherein the roughening laser and the cutting laser are the same.

19. The system of claim 14, further comprising an edge polisher for polishing a laser melted edge of the corundum.

20. The system of claim 14, wherein a plurality of roughening apparatuses feed to a single cutting laser.

21. The system of claim 14, wherein the cutting laser comprises a microsecond pulsed laser.

22. The system of claim 21, wherein the microsecond pulsed laser is configured to operate at approximately between 25 and 150 Watts average power.

23. The system of claim 21, wherein the microsecond pulsed laser operates in the infrared region of the electromagnetic spectrum.

24. A method of cutting sapphire having a polished surface comprising:
   roughening the polished surface to create a roughened spot on the polished surface; directing a cutting laser beam on the roughened spot to initiate a cut into the sapphire, wherein the roughened spot outwardly faces the cutting laser beam; and
   cutting though the sapphire using the laser along a path on the polished surface that extends beyond the roughened spot.

25. The method of claim 24, wherein the cutting laser is a microsecond pulse laser at an infrared wavelength.

26. The method of claim 24, wherein roughening the polished surface is performed using a roughening laser beam having operating parameters that are different than the cutting laser beam.

27. The method of claim 24, further comprising:
   forming multiple roughened spots on the polished surface; and
   initiating multiple laser cuts using the multiple roughened spots.

* * * * *